(No Model.)
G. LUPPERT.
TENONING MACHINE.
No. 286,546. Patented Oct. 9, 1883.
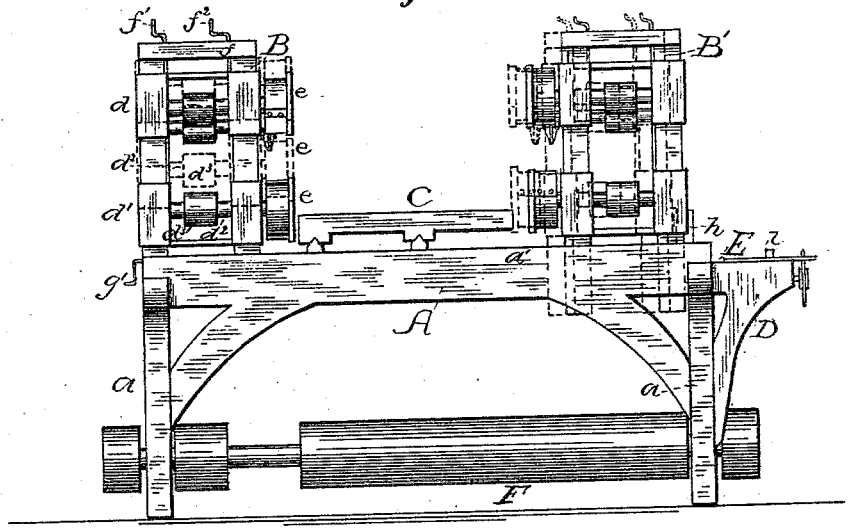
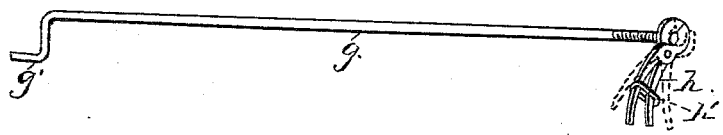
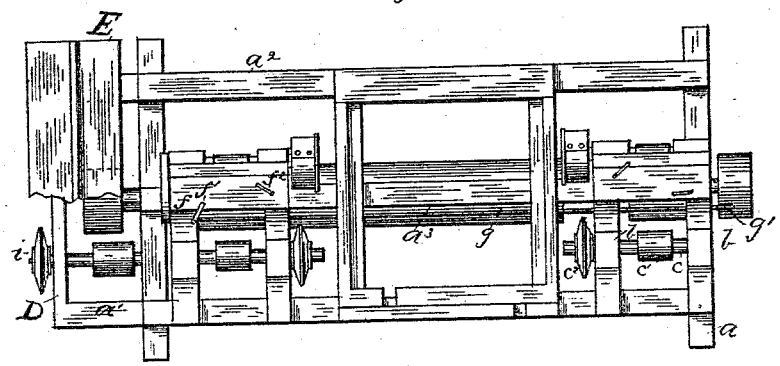
Witnesses:
J. E. Clark
M. J. Baggett
Inventor
George Luppert
By Geo. W. Dyer
Attorney.

UNITED STATES PATENT OFFICE.

GEORGE LUPPERT, OF WILLIAMSPORT, PENNSYLVANIA.

TENONING-MACHINE.

SPECIFICATION forming part of Letters Patent No. 286,546, dated October 9, 1883.

Application filed December 1, 1882. (No model.)

*To all whom it may concern:*

Be it known that I, GEORGE LUPPERT, of Williamsport, in the county of Lycoming and State of Pennsylvania, have invented a new and useful Improvement in Tenoning-Machines; and I do hereby declare that the following is a full and exact description of the same, reference being had to the accompanying drawings, and to the letters of reference marked thereon.

The invention hereinafter described relates particularly to that class of machines which are adapted to the preparation of rail-pieces which form the frame-work of bureaus, washstands, and other similar articles of manufacture, the preparation thereof consisting in the combined work of cutting, tenoning, and grooving of the rails.

The object of the invention is to greatly facilitate this preparation of the rail-pieces by rendering the machine used therefor capable of cutting them any desired length and forming a complete tenon simultaneously on both ends thereof or upon one end only, as circumstances may require. These results are accomplished by employing a table or framework of any suitable construction, upon which is supported the operative parts of the machine, and by providing the same on its top with a stationary and an adjustable upright frame, the former located on one end of the frame and the latter on the opposite end thereof. These upright frames are each provided with a circular saw and two cutter-heads, respectively, for the cutting of the rail and the formation of the tenon upon each end of the same. The cutter-heads are mounted in suitable bearings arranged in the back of said frame, said bearings being so arranged that by the use of certain mechanism they may be adjusted vertically, and thereby enable the cutter-heads to be adjusted to form any thickness of tenon on the rail. At one end the frame-work of the machine is provided with an extension which supports a shaft provided with a circular saw, which operates to form the necessary grooves or notches in the rails. This extension is provided with a hinged leaf or table, upon which the rails are supported while being grooved. Motion is imparted to the shafts upon which the cutter-heads and saws are mounted by means of suitable belts passed around pulleys, with which said shafts are provided, and similar pulleys on the main driving-shaft of the machine.

For the better understanding of my invention, and to enable those skilled in the art to make and use the same, I will now proceed to give in detail a description thereof, and in so doing will make frequent reference to the accompanying drawings, and to the letters of reference marked thereon, said drawings forming part of this specification, and representing, in—

Figure 1, a rear elevation of a machine embodying my invention; Fig. 2, a top plan view of the same; and Fig. 3 is a view in detail of the split nut and rod by which the movable frame may be adjusted upon the main frame.

Like letters refer to corresponding parts in all the views.

In the drawings, A represents the frame-work of the machine, which consists of the uprights $a\ a$ and cross-pieces $a'$, $a^2$, and $a^3$. At one end of this frame and on the top thereof an upright frame, B, is firmly secured, said frame B resting upon the cross-pieces $a'$ and $a^2$. On its front face this frame B is provided with brackets $b\ b$, which serve to support a shaft, $c$, to which are secured firmly a pulley, $c'$, and a circular saw, $c^2$, the pulley serving to impart motion to said shaft, and the saw $c^2$, in conjunction with other mechanism, serving to cut the rail-pieces. Secured to the opposite side of the frame B, and moving in suitable grooves with which said frame is provided, are two sets of brackets or supports, $d\ d'$, each of which carries a shaft, $d^2$, motion being imparted to said shafts by means of suitable belts, which pass over pulleys $d^3$, with which they are provided. To one end of each of these shafts $d^2$, as shown in drawings, is secured a cutter-head, $e$, between which the rail to be operated upon is passed, and by means of which the tenon is cut on the ends of said rails.

Passing through a cross-piece, $f$, which forms the upper portion of the frame B, and down through the brackets $d\ d'$ are two screw-threaded rods, $f'\ f^2$, by means of which these brackets and the shafts and cutter-heads they support are raised and lowered. By means of the vertical adjustment of the cutter-heads which is thus accomplished, it becomes possible to regulate the thickness of the tenon to be cut in the rail-pieces. Upon the opposite end of the frame A is located an upright frame, B', which is similar in general construction to the one B before described. This frame B' is provided with a circular saw and with cutter-heads similar in construction and use and operated in the same manner as those described in connection with frame B, and with similar mechanism for affording vertical adjustment to said cutter-heads. The frame B' is, however, unlike the one B, in that it is loosely secured on the cross-pieces $a'$ and $a^2$, and is capable of horizontal adjustment thereon. The mechanism by means of which this adjustment is accomplished is as follows, viz: A long metal rod, $g$, shown in Fig. 2 of the drawings, passes at one end through the frame A, and at the other end has suitable bearing in the lower portion of the frame B'. At one end this rod is provided with a handle, $g'$, and at the other where it passes through the frame B' is suitably screw-threaded. I also employ a tongue or split-nut, $h$, as a preferred means for quickly adjusting the frame B' to a desired position. This tongue or split nut is mounted upon the screw-threaded end of rod $g$, and is in form and function similar to a pair of pinchers. By opening the tongue or split nut, as seen by dotted lines, Fig. 3, the bearing of the rod $g$ is loosened, and the frame B', to which this tongue is riveted, is in a condition to be adjusted to a desired position, and then be secured by closing the tongue and slipping a ring or sleeve, $h'$, over the same, as shown in Fig. 3. If it be desired to adjust the frame B' without the aid of tongue or split nut $h$, recourse may be had to handle or crank $g'$, in which instance the tongue $h$ must be closed, as shown by solid lines, Fig. 3. By means of this adjusting mechanism, it will be seen that the length of the rail can be easily regulated, and, further, when it is desired to form a tenon on but one end of the rail, the frame B' may be caused to occupy such a position that the cutter-heads with which it is provided will not come in contact with or operate upon said rail.

Secured to the cross-pieces $a'$, $a^2$, and $a^3$ of the frame A are suitable rails, upon which is placed and moved the rail-carrying table C, said table being constructed and operated in substantially the same manner as the one shown and described in Letters Patent No. 265,523, issued to me October 3, 1882. At one end of the frame A, as shown in drawings, is formed an extension, D, upon which is supported a hinged grooving-table, E, and a grooving-saw, $i$, the whole being similar in construction, operation, and use to the same parts described in the Letters Patent above referred to.

The main driving-shaft F, which may be situated at any desired portion of the machine, is provided with suitable pulleys, through the medium of which belt connection is made be-between the power-giving engine and the shafts upon which are secured the cutter-heads and saws before referred to.

The operation of the machine is substantially as follows, viz: The length of the rail and the thickness of the tenon being determined, the adjustable frame B' and the adjustable cutter-heads supported in frame B and B' are regulated accordingly, as also is the extension rail-carrying table C. The material being then placed on the table C and motive power being applied to the several operative parts, said table is moved along its rails and the circular saws and cutter-heads perform, respectively, their work of cutting the rails and forming the tenons thereon. After the rails have been thus cut and tenoned, they are placed on the grooving-table E and the groove or notch is cut therein by means of the grooving-saw $i$. When it is desired to cut and tenon but one end of the rail, the frame B' and the saw and cutter-heads with which it is provided are moved from contact with said rail by means of the adjusting mechanism described.

Having thus described my invention, what I claim as new therein, and that for which I desire to secure Letters Patent, is—

In the machine described, the combination, with the stationary frame B, provided with the vertically-adjustable cutter-heads $e$, of the movable frame B', likewise constructed, and horizontally adjustable toward or from the former by means of rod $g$ or split nut $h$, substantially as and for the purpose set forth.

In testimony whereof I affix my signature in presence of two witnesses.

GEORGE LUPPERT.

Witnesses:
A. R. CLEMENS,
FRED CHATHAM.